March 31, 1964    J. FRANCEL ETAL    3,127,278
LOW-MELTING GLASS SEALANT AND ARTICLE MADE THEREFROM
Filed Feb. 26, 1960
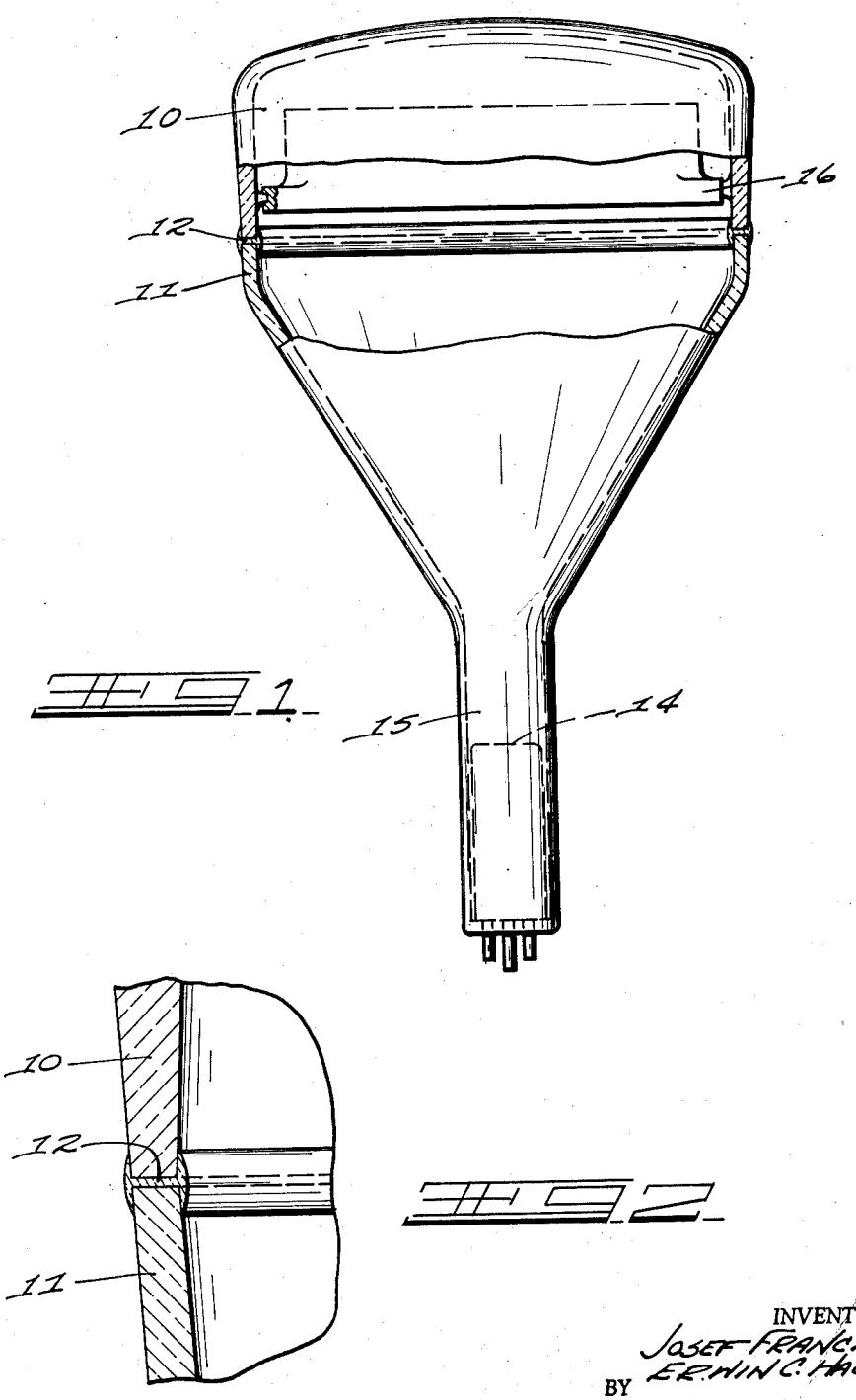
INVENTORS
Josef Francel &
BY  Erwin C. Hagedorn
W. A. Schaich &
E. J. Holler
ATTORNEYS

3,127,278
LOW-MELTING GLASS SEALANT AND ARTICLE MADE THEREFROM
Josef Francel, Toledo, and Erwin C. Hagedorn, Oregon, Ohio, assignors to Owens-Illinois Glass Company, a corporation of Ohio
Filed Feb. 26, 1960, Ser. No. 12,243
10 Claims. (Cl. 106—53)

This application is a continuation-in-part of Serial Number 762,089, filed September 19, 1958, now abandoned, which is a continuation-in-part of Serial No. 554,753, filed December 22, 1955, now abandoned, which, in turn, is a continuation-in-part of Serial No. 481,008, filed January 10, 1955, and now abandoned.

This invention relates to the manufacture of glass articles and particularly to the type where it is found necessary to assemble separate prefabricated glass parts and to join them in some manner, such as by fusing or welding to form thereby a single item. For example, to form a glass block or a cathode ray tube it is required to join two prefabricated glass parts to form a single or composite article.

The joining of such parts, particularly direct glass-to-glass joining, involves the use of rather high temperatures in order that the glass parts may be fused one to another. The generation of such high temperatures also generates other conditions detrimental to the glass parts such as deformation of the articles to be joined as well as generating permanent stresses which may at some later time result in breakage either spontaneously or from some form of shock. Such high temperature sealing or fusing may not be safely used in joining certain glass blocks, for example, one where a color screen is imposed between the parts. Also, in the making of cathode tubes for color TV reception the color grids and phosphors will be damaged by exposure to such required high temperatures.

In order to avoid these objectionable features in the sealing or joining of glass parts, it is proposed to make use of a new composition of soldering or brazing glass in forming the joint between two separate glass parts. Such brazing or soldering glasses are essentially glass compositions which soften, seal together or seal to other glasses at temperatures below those which would be normally required to join the separate glass parts in a glass-to-glass seal.

It is an object of this invention to provide a material for forming vitreous seals as between two prefabricated hard glass parts wherein the seal can be made at temperatures below those which cause distortion of the glass parts due to heating.

It is also an object of this invention to provide prefabricated parts with a coating of a sealing composition dispersed over the open sealing edges so that these parts may be later sealed and assembled.

Another object of this invention is to provide a particular type of sealing composition for assembling prefabricated glass or other parts in composite relation and with such composition having the physical properties and characteristics which will permit the successive sealing together of these parts, reopening the sealed parts and resealing said parts several times in spaced succession.

It is a further object to provide sealing compositions having characteristics which permit the sealing of soda-lime-silica glass parts together at a temperature below that at which permanent stresses are introduced into the glass parts.

It is a further object to provide a sealing composition having a softening point and thermal contraction which will have a definite relation to the corresponding properties of the glass parts which are to be sealed or joined.

Other objects will be apparent from the following disclosure.

In the drawings:
FIG. 1 is a side elevational view of a cathode tube; and
FIG. 2 is a partial sectional view of the juxtaposed sealing edges of a glass article.

As one illustration of the application of this invention, reference will be made to the sealing together of an all-glass cathode ray tube, for example, a tube of a type to be used in the production of color TV pictures.

In such sealing, it is, of course, essential that the temperatures required to seal the hard prefabricated glass parts together be maintained at a level below that which would be apt to distort such items as the shadow mask or damage the phosphors or other elements mounted within and upon one of the glass members forming a part of the tube. Such temperatures are also limited by the physical annealing characteristics of the glass parts.

In using this composition, it is intended that the edges of the glass parts which are to be sealed together must be approximately flat or have opposing surfaces of mating contour. At least one of the edges of the parts to be joined will be coated with this sealing composition and juxtapositioned on one another in sealing alignment. The superimposed parts may then be subjected to a temperature below that which would impart permanent stress to the glass parts but still of a degree sufficient to melt the sealing composition and to join such composition to the glass parts thereby joining the glass parts to each other. Pressure may be applied to the parts when being sealed if desired or required and may be either fluid or mechanical.

It is also intended in the use of this composition to provide a situation wherein glass parts such as the parts of a cathode ray tube may be sealed together and may thereafter be reopened or unsealed and then again sealed. Such a procedure may be carried out several times in succession and without breakdown or adverse devitrification of the sealing glass.

It is also within the purview of this invention that prefabricated glass parts such as the members of a television tube or the halves of a glass block may have their sealing edges coated with this sealing composition, packed and shipped to a remote point for final assembly. At this remote point, the members of the glass tube or block may be placed in superimposed relation with the coated edges of each member in contact and then subjected to a temperature below the annealing temperature of the glass parts to weld and seal the parts together.

This sealing composition will, of course, differ in composition from the glass parts to be sealed or joined.

The ingredients most effective for providing a low fusion temperature in the composition are the oxides of boron, lead and other metal oxides which are capable of providing a low fusion temperature. The quantiy of these oxides which may be utilized in these compositions is limited by the desired contraction coefficient in the glass resulting from the composition.

We have found that certain sealing glass compositions which consist essentially of lead oxide (PbO), boric oxide ($B_2O_3$), zinc oxide (ZnO), and copper oxide (CuO) and in which the PbO is the major element, provide and maintain a satisfactory contraction coefficient. Also, a desirable chemical durability will exist as well as sufficient resistance to devitrification under most conditions.

We have further found that if, in addition to the foregoing four components, there is present in the composition a small percentage of $SiO_2$, even much more satisfactory sealing compositions are obtained from the standpoint of having excellent resistance to devitrification.

Thus, the compositions resist devitrification even under severe conditions of repeated reheating and cooling of the composition, which conditions are necessary in some uses of the sealing compositions.

In the compositions of the invention disclosed hereinafter in more detail, the CuO plays a very important role. It has been found that it is possible to control the fluidity or viscosity of the solder glasses containing PbO, $B_2O_3$, ZnO and $SiO_2$ (when present) by inclusion of minor amounts of CuO in the composition. In any particular base composition of the foregoing three or four (when $SiO_2$ is used) components, replacement of part of the $B_2O_3$, ZnO or $SiO_2$ or any combination of same lowers the viscosity of the composition without materially affecting the important practical property of the contraction coefficient. Viscosity could be lowered by increasing the PbO at the expense of other constituents, but this greatly affects the contraction coefficient of the sealing glass.

The great fluidity and utility of our compositions has been demonstrated by the fact that seals of small parts have been made with almost "flash" heating, that is, the parts were sealed together with only about one minute of heating.

The properties of the composition to be used for this low temperature sealing glass are adapted to function with and are related to the properties of the glass making up the prefabricated glass parts to be sealed together. For instance, the contraction coefficient of the brazing glass must be related in a certain manner to the contraction coefficient of the glass to be sealed. The control of the contraction coefficient of the sealing glass with relation to that of the parts to be sealed is of the greatest importance and such control is provided through the control of the composition of the sealing glass. In addition, the fiber softening point of the brazing or sealing composition preferably should not be higher than the strain point of the glass from which the article is made and should preferably reside within a temperature range of from 600°–850° F., preferably below 800° F.

The overlap of the physical properties of the brazing glass and the parent glass, as to fusion characteristics, should be such that the brazing glass can perform its sealing function with a minimum disturbance of the shape or stress pattern of the glass article beyond tolerable limits. ("Properties of Glass," by G. Morey, 2nd ed., pages 164–167.)

Due to the radical difference in the contraction rate above and below the transformation range of glass (Morey, 2nd ed., "Properties of Glass," page 267) and due to the radical difference in the transformation range as between the brazing glass and the prefabricated hard glass parts and also due to the fact that the transformation range of the brazing glass is much below that of the hard glass, it is necessary that the brazing glass have a thermal contraction coefficient somewhat below that of the hard glass, otherwise an extremely detrimental strain will be set up at the sealing area. In such a situation, the total contraction between the temperature at which the brazing glass sets up and room temperature must match the total contraction of the hard glass from that same temperature to room temperature in order to produce a totally stress-free seal in accordance with the demands of this present invention.

The setting point temperature of the composition is that temperature below which the glass has insufficient viscous flow to relieve strains set up in the glass during cooling. For most glasses this temperature is approximately 10° to 20° C. below their annealing temperatures. (Littleton and Roberts, 1920, Journal American Optical Society, volume 4, page 224.) We have found that the contraction coefficients (250° to 0°) of the soft glass should preferably be about 5 to $15 \times 10^{-7}$ cm. per cm. per ° C. below that of the glass parts to be joined. In order to obtain a strain-free seal between two glasses of different softening temperatures (J. T. Littleton, Journal Soc. Glass Technology, 1940, volume 24, page 176) it requires that the overall thermal contraction per unit of length between the setting point temperature of the softer glass and room temperature should be the same for both glasses. Under these conditions, the contration coefficients (250° to 0° C.) of the new sealing glasses or compositions are about 5 to $15 \times 10^{-7}$ per ° C. less than that of commercial soda-lime-silica glass and other glasses of similar characteristics. The softening temperature of a glass as referred to herein is determined in accordance with J. T. Littleton, "A Method for Measuring the Softening Temperatures of Glasses," Journal of American Ceramic Society, volume 10, 1927, page 259.

By mating the parts at a temperature where the brazing glass sets up, it is thus possible to provide perfect mating at room temperature since the overall contractions of the hard glass parts and the soft sealing glass are identical.

Compositions of lead oxide (PbO) and boric oxide ($B_2O_3$) alone will not at the temperatures contemplated herein provide a sealing composition capable of yielding a satisfactory control of devitrification, thermal contraction and fiber softening point. Therefore, the component elements of the sealing compositions contemplated within this invention consist essentially of lead oxide (PbO), boric oxide ($B_2O_3$) and additions of relatively small but critically important amounts of the oxides of zinc and copper. $Ag_2O$, $Sb_2O_3$ and metal oxides of the transition group can be included, if desired, in judiciously selected small amounts of not more than 10%.

Typical compositions are such as disclosed in Table I below. These are examples of sealing glasses containing no $SiO_2$.

Table I

|  | 1 | 2 | 3 | 4 | 5 | 6 | 7 |
|---|---|---|---|---|---|---|---|
| PbO | 71 | 68.4 | 71.4 | 70 | 72 | 70 | 71 |
| $B_2O_3$ | 17 | 18.6 | 19.6 | 14 | 19 | 15 | 17 |
| ZnO | 9 | 9 | 7 | 11 | 6 | 8 | 6 |
| CuO | 3 | 4 | 2 | 5 | 3 | 5 | 3 |
| $Ag_2O$ |  |  |  |  |  |  | 1.5 |
| Fiber Softening Point, °F | 765 | 794 | 795 | 735 |  |  |  |
| Coefficient of Contraction $\times 10^{-7}$ (250° C.–0° C.) | 90.0 | 88.3 | 90.0 | 90.0 |  |  |  |

An especially useful sealing composition is that shown in composition "1" of Table I. The foregoing sealing glasses all have fiber softening points below 800° F., and sealing glasses of this invention with such low fiber softening points are preferred.

The sealing glass compositions of this invention consist essentially of the following ingredients in the following proportions:

Table II

| | Percent by weight |
|---|---|
| Lead oxide (PbO) | 67–73 |
| Boric oxide ($B_2O_3$) | 11–21 |
| Zinc oxide (ZnO) | 0.5–11 |
| Copper oxide (as CuO) | 0.5–10 |
| Silicon oxide ($SiO_2$) | 0–6 |

The above compositions preferably do contain $SiO_2$, in amounts from about 1.5 to about 6 percent by weight, and preferably contain from 3–11% ZnO and from 1.5 to 6% CuO.

While the compositions of this invention usually consist of the foregoing components in the foregoing amounts as in Table II, except for impurities occasionally introduced with intended ingredients, it is possible to judiciously select additions of other components to be included in compositions falling within the above ranges, such as up to 10% of CdO, up to 5% $Ag_2O$, and small amounts of $Al_2O_3$, up to 2 weight percent, and yet still stay below the fiber softening point of 800° F., as preferred.

In compositions falling within the ranges of Table II and containing 1.5 to 6 weight percent $SiO_2$, a particularly useful class of compositions contains a total of 16–18% of the combined total of $B_2O_3$ and $SiO_2$.

Sealing composition of the invention can be used with various types of lead or lead-free type compositions of glass as well as other glasses designed specifically for cathode ray or light transmitting tubes or articles. Typical of such base or hard glass compositions with which this sealing glass may be used are those illustrated in Table III here below:

Table III

|  | A | B | C |
|---|---|---|---|
| Silica ($SiO_2$) | 63.0 | 68.0 | 70.0 |
| Alumina ($Al_2O_3$) | 1.2 | 1.5 | 4.2 |
| Sodium ($Na_2O$) | 7.0 | 6.5 | 17.6 |
| Potassium ($K_2O$) | 10.0 | 11.0 | 1.1 |
| Barium (BaO) | 9.6 | 12.0 | 0.5 |
| Lead (PbO) | 7.6 |  |  |
| Calcium Oxide (CaO) | 1.0 |  | 6.6 |
| Antimony ($Sb_2O_3$) | .1 | .5 |  |
| Fluorine ($F_2$) | .5 | .5 |  |
| Coefficient of Expansion×$10^{-7}$ (Between 0–300° C.) | 101.4 | 101.7 | 102.5 |

Table III above illustrates three compositions of glass with which these sealing glasses may be utilized and in particular the sealing composition 1 of Table I is highly compatible with these three compositions. It is understood that the various sealing compositions of the invention can be used also with other compatible compositions of base glass.

Some examples of the preferred compositions where great resistance to devitrification is desired are shown in the following Table IV, which shows the components in weight percent.

Table IV

|  | 8 | 9 | 10 | 11 |
|---|---|---|---|---|
| PbO | 71 | 71 | 72 | 71.17 |
| $B_2O_3$ | 14 | 11 | 13 | 15.40 |
| ZnO | 9 | 9 | 9 | 9.47 |
| CuO | 3 | 3 | 3 | 1.88 |
| $SiO_2$ | 3 | 6 | 3 | 2.08 |
| Fiber Softening Point, °F. | 765 | 770 | 756 | 770 |
| Coefficient of contraction×$10^{-7}$ (250° C.–0° C.) | 89.8 | 89.6 | 90.6 | 90.0 |
| Devitrification range in °C. (25° C.–850° C.) | none | none | none | none |

It will be noted that compositions 8 and 9 are the same as composition 1 except for substitution of part of the $B_2O_3$ with $SiO_2$. These substitutions had little effect on the fiber softening point, but the compositions are highly stabilized and provide a high degree of freedom from devitrification and other difficulties during successive reheating and resealing of glass parts.

Stated otherwise, the sealing may be carried on without any particular care being exercised as to control of atmosphere and temperature conditions so far as the composition per se may be concerned.

Composition 11 is a highly satisfactory and now preferred composition for sealing base or hard glass compositions of Table IV and other base glasses have similar coefficients. It is representative of highly stable compositions now preferred for this use and consisting essentially of the following components within the narrow ranges shown in Table V:

Table V

| | Percent by weight |
|---|---|
| PbO | 70–72 |
| $B_2O_3$ | 14–17 |
| ZnO | 8–11 |
| Copper oxide (as CuO) | 1.5–2.5 |
| $SiO_2$ | 1.5–3 |

Fiber softening point, °F. below 790° F.

The other compositions of Table IV are also compatible with glass compositions of Table III.

Other examples of vitreous solder glass compositions of the invention having fiber softening points below 800° F. include the following:

| | Percent by Weight | | | |
|---|---|---|---|---|
| | 12 | 13 | 14 | 15 |
| PbO | 68 | 73 | 70 | 72 |
| $B_2O_3$ | 18 | 13 | 16 | 16 |
| ZnO | 8 | 8 | 8.5 | 8 |
| CuO | 3 | 3 | 2.5 | 2.5 |
| $SiO_2$ | 3 | 3 | 3 | 1.5 |

The described soft sealing glasses of the invention can be applied to the juncture edges of the preformed glass parts in various manners for the purpose of joining such parts into a permanent fusion or weld without distortion of said parts. Preferably, the sealing composition is melted in a container and brought to a temperature of approximately 2000° F. and the glass part which has been preheated to a point below that of which distortion will occur is dipped into the molten composition to the depth desired in the particular seal to be accomplished. This can be accomplished either by preheating the article or dipping the article while it is still hot from the molding or fabricating operation.

Several other methods of applying the composition of the sealing edges of the prefabricated glass parts can also be utilized, as, for example, the composition can be milled to a fine mesh and joined with a carrier such as water, glyptol, or any other liquid carrier or agent in the form of a paste which when subjected to heat is not prone to leave foreign or carbonaceous deposits in the seal. Such carriers can be used with the milled or powdered composition to form a paste which can be added to one or both of the edges to be sealed either by brushing, extrusion or any other such application as is conducive to the handling of a paste-like composition. Other methods of applying the composition are also contemplated, such as flowing, spraying or by a coated roller application. It is also contemplated that the heated members to be joined can also be dipped into the powdered composition so that by thermal adherence, a coating composition will be dispersed along the seal edge of the member so dipped.

The quantity of the sealing composition 12 required to seal the two parts together is relatively small and the greatest thickness thereof remaining in any seal is that where small irregularities may exist between the two surface areas being joined. In the majority of instances the thickness of the sealing composition 12 between the two glass members is relatively thin.

The glass parts 10 and 11 which have been coated in any one of several desirable manners are then juxtaposed one upon the other as in FIGS. 1 and 2, with the coated mating edges brought into physical contact and then are subjected to a temperature within the range of from approximately 600° F. to 850° F., but in any event, below that temperature at which distortion of the glass members will occur or which would affect component parts within a tube, such as a color mask 16.

Such heating can be accomplished in an oven or an annealing lehr (not shown) or by the application of electrical energy in any one of several manners.

It is contemplated that the glass members 10 and 11 be sealed together by subjecting them to a temperature below the annealing temperature of the prefabricated glass parts or the parts can be sealed together when annealing or reannealing the glass parts. In any event, when the glass parts are sealed together, the drop in temperature from the sealing temperature down to room temperature can be controlled so as to anneal said composition.

In general, compositions of glasses which can be joined by means of our new compositions, include the approximate range of basic compositions, as follows:

| | |
|---|---|
| $SiO_2$ | 60–80 |
| CaO | 0–12 |
| $Al_2O_3$ | 0–5 |
| $Na_2O$ | 4–18 |
| $K_2O$ | 0–11 |
| BaO | 0–12 |
| PbO | 0–15 |
| Coefficient of expansion $\times 10^{-7}$ (between 0–300° C.) | 96–104 |

It is not intended that the range of compositions given above for making lead and soda-lime silica glasses shall in any way limit the use of these new sealing compositions.

It is also contemplated that this sealing composition be utilized to seal or join glass to metal parts. As an illustration (FIG. 1) the electron beam gun 14 forming a part of the usual television tube is normally sealed in the neck portion 15 of the tube funnel 11 and this present sealing composition facilitates the sealing of these guns to the glass forming the neck 15 of the tube part 11, particularly because they permit a seal to be obtained at relatively low temperatures, viz., temperatures below the distortion point of the glass. Other seals as between various types of metals and glass can likewise be accomplished with the present compositions.

Reference is made in the body of this specification to "hard glass" and that term is intended to mean glass that has been given a shape either by molding or otherwise and which is at a temperature conducive to the retention of such shape.

In the use of these sealing compositions, for example, in fabricating cathode tubes for television, the need for sealing, opening and resealing is not only often an economic necessity, but it is also often an operative or fabricating necessity because in the assembling of the component parts of a tube, such as a color television tube, it is quite possible that parts are not in sufficiently exact alignment and the only possible way to correct same is to open the tube, make the required adjustments and reseal. In addition, it is contemplated that after use in the field some of the parts will require replacement and to do this, the same opening and resealing procedure will obtain. Consequently, the sealing composition must be capable of being repeatedly subjected to heating and cooling without the loss of any of its desirable characteristics, such as may be caused by any form of deterioration or devitrification in the sealing material. Particularly, the composition must resist devitrification in the temperature range where these repeated seals are to be made. Also, its chemical durability must be such as to resist the water and acid attack to which it is subjected during the final fabrication of a cathode tube. Although all of the compositions set forth herein do have high resistance to devitrification and chemical attack, it is desirable that such resistance be at a maximum that will insure against any sort of breakdown of the material under any and all conditions to which it may be subjected over long periods of time. Consequently, under such severe conditions, the compositions containing $SiO_2$ according to this aspect of the invention are quite important.

By the use of $SiO_2$ in amounts of from approximately 1.5 to 6% by weight of the total components of the composition, a substantially complete absence of devitrification will obtain, either under sealing and resealing conditions or acid attack conditions. It is found that the use of silica beyond amounts of approximately 6% in these compositions is unnecessary because beyond this point the silica does not produce any further increase in beneficial results so far as devitrification control is concerned and particularly without affecting the other desirable characteristics of the compositions.

The compositions of the invention can be utilized in the molten dipping process previously disclosed herein, and without encountering the problem of devitrification due to atmospheric exposure or continuous heating of the composition in order to maintain the molten state thereof. This is especially true of the compositions containing silica.

In general, the compositions of the invention containing silica permit repeated consecutive sealing, opening, and resealing of television or cathode tubes or other glass members sealed together with these compositions without incipient devitrification and without detrimentally affecting the desirable characteristics of these compositions or the seals made therewith and therefrom.

As will be evident to those skilled in the art, various modifications of this invention can be made or followed in the light of the foregoing disclosure and discussion without departing from the spirit and scope of the disclosure or from the scope of the claims.

We claim:

1. A sealing glass composition which consists essentially of the following:

| | Percent by weight |
|---|---|
| Lead oxide (PbO) | 70–72 |
| Boric oxide ($B_2O_3$) | 14–17 |
| Zinc oxide (ZnO) | 8–11 |
| Copper oxide (CuO) | 1.5–2.5 |
| Silicon oxide ($SiO_2$) | 1.5–3 | said composition having a fiber softening point below 790° F.

2. A sealing glass composition which consists essentially of the following ingredients within the following range of proportions by weight:

| | Percent by weight |
|---|---|
| Lead oxide (PbO) | 67–73 |
| Boric oxide ($B_2O_3$) | 11–21 |
| Zinc oxide (ZnO) | .5–11 |
| Copper oxide (CuO) | .5–10 |
| Silicon oxide ($SiO_2$) | 1.5–6 |

3. A sealing glass composition consisting essentially of the following ingredients in the following proportions:

| | Percent by weight |
|---|---|
| Lead oxide (PbO) | 67–73 |
| Boric oxide ($B_2O_3$) | 11–21 |
| Zinc oxide (ZnO) | 0.5–11 |
| Copper oxide (CuO) | 0.5–10 |
| Silicon oxide ($SiO_2$) | 0–6 |

4. A sealing glass composition consisting essentially of the following ingredients in the following proportions:

| | Percent by weight |
|---|---|
| Lead oxide (PbO) | 67–73 |
| Boric oxide ($B_2O_3$) | 11–21 |
| Zinc oxide (ZnO) | 3–11 |
| Copper oxide (CuO) | 1.5–6 |
| Silicon oxide ($SiO_2$) | 1.5–6 |

5. A composition according to claim 2 wherein the total of the combined percentages by weight of $B_2O_3$ and $SiO_2$ lies in the range from 16–18%.

6. A sealing glass composition consisting essentially of 67–73% lead oxide, 11–21% boric oxide, 0.5–11% zinc oxide, 0.5–10% copper oxide (as CuO), 0–6% silicon dioxide, 0–10% cadmium oxide, 0–5% silver oxide, and 0–2% alumina, said percentages being by weight, the fiber softening point of said glass being below 800° F.

7. A low expansion sealing composition for joining prefabricated glass parts which consists essentially of 71.17% lead oxide (PbO), 15.40% boric oxide ($B_2O_3$), 9.47% zinc oxide (ZnO), and with the addition of 1.8% copper oxide (as CuO) and 2.0% silicon dioxide ($SiO_2$).

8. Composite glass article comprising sealed glass parts, said glass parts having a sealing glass composition therebetween and integral therewith, which sealing glass composition consists essentially of the following ingredients in the following proportions:

| | Percent by weight |
|---|---|
| Lead oxide (PbO) | 67–73 |
| Boric oxide ($B_2O_3$) | 11–21 |
| Zinc oxide (ZnO) | 0.5–11 |
| Copper oxide (as CuO) | 0.5–10 |
| Silicon oxide ($SiO_2$) | 0–6 |

9. Composite glass article comprising sealed glass parts, said glass parts having a sealing glass composition therebetween and integral therewith, which sealing glass composition consists essentially of the following ingredients in the following proportions:

| | Percent by weight |
|---|---|
| Lead oxide (PbO) | 67–73 |
| Boric oxide ($B_2O_3$) | 11–21 |
| Zinc oxide (ZnO) | 3–11 |
| Copper oxide (as CuO) | 1.5–6 |
| Silicon oxide ($SiO_2$) | 1.5–6 |

10. Composite glass article comprising sealed glass parts, said glass parts having a sealing glass composition therebetween and integral therewith, which sealing glass composition consists essentially of the following ingredients in the following proportions:

| | Percent by weight |
|---|---|
| PbO | 70–72 |
| $B_2O_3$ | 14–17 |
| ZnO | 8–11 |
| Copper oxide (as CuO) | 1.5–2.5 |
| $SiO_2$ | 1.5–3 |

References Cited in the file of this patent

UNITED STATES PATENTS

| 2,642,633 | Dalton | June 23, 1953 |
| 2,889,952 | Claypoole | June 9, 1959 |
| 2,931,142 | Veres | Apr. 5, 1960 |

FOREIGN PATENTS

| 634,548 | Great Britain | Mar. 22, 1950 |